(12) United States Patent
Eggiman et al.

(10) Patent No.: US 6,383,101 B2
(45) Date of Patent: May 7, 2002

(54) BALL BAT

(75) Inventors: Michael D. Eggiman, Hillsboro; Mark A. Fritzke, Portland, both of OR (US); Steven J. Maier, Underwood, WA (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

(21) Appl. No.: 09/769,714

(22) Filed: Jan. 24, 2001

Related U.S. Application Data

(62) Division of application No. 09/108,754, filed on Jul. 1, 1998, now Pat. No. 6,251,034.

(51) Int. Cl.$^7$ .............................................. A63B 59/06
(52) U.S. Cl. ....................................................... 473/567
(58) Field of Search ................................. 473/564–568, 473/457, 519, 520

(56) References Cited

U.S. PATENT DOCUMENTS

| | | | |
|---|---|---|---|
| 3,876,204 A | 4/1975 | Moore et al. | |
| 3,963,329 A | 6/1976 | Fujii | |
| 4,505,479 A | * 3/1985 | Souders ...................... | 473/567 |
| 4,569,521 A | 2/1986 | Mueller | |
| 4,848,745 A | 7/1989 | Bohannan et al. | |
| 4,933,040 A | 6/1990 | Wesley, Jr. | |
| 5,104,123 A | 4/1992 | Okitsu et al. | |
| 5,364,095 A | 11/1994 | Easton et al. | |
| 5,415,398 A | 5/1995 | Eggiman | |
| 5,458,330 A | 10/1995 | Baum | |
| 5,511,777 A | 4/1996 | McNeely | |
| 5,722,908 A | 3/1998 | Feeney et al. | |
| 6,022,282 A | * 2/2000 | Kennedy et al. ............. | 473/567 |
| 6,053,828 A | * 4/2000 | Pitsenberger ................ | 473/566 |
| 6,071,460 A | * 6/2000 | Renaudin et al. ........... | 264/314 |

FOREIGN PATENT DOCUMENTS

| | | |
|---|---|---|
| JP | 51-13165 | 8/1976 |
| JP | 4-303477 A | 10/1992 |
| JP | 5-23407 | 2/1993 |

* cited by examiner

*Primary Examiner*—Mark S. Graham
(74) *Attorney, Agent, or Firm*—Klarquist Sparkman, LLP

(57) ABSTRACT

The present invention provides an insert, or sleeve, for use in a baseball or softball bat that improves power transfer from the bat to the batted ball. The insert includes multiple layers of composite material. Most of the layers include fibers that are directed substantially circumferentially about the insert. Since the largest component of stress within the insert produced by an impact with a ball is typically compressive hoop stress, which is directed substantially circumferentially about the insert, the circumferential layers are able to withstand the majority of the stress produced by an impact. The insert also includes non-circumferential layers that serve to hold the circumferential layers together and withstand the smaller stresses in other directions. Because the insert has its greatest strength in substantially the circumferential direction, less material is required to withstand the stress produced by repeated impacts with a ball. The insert also produces a bat having superior impact response characteristics.

16 Claims, 2 Drawing Sheets

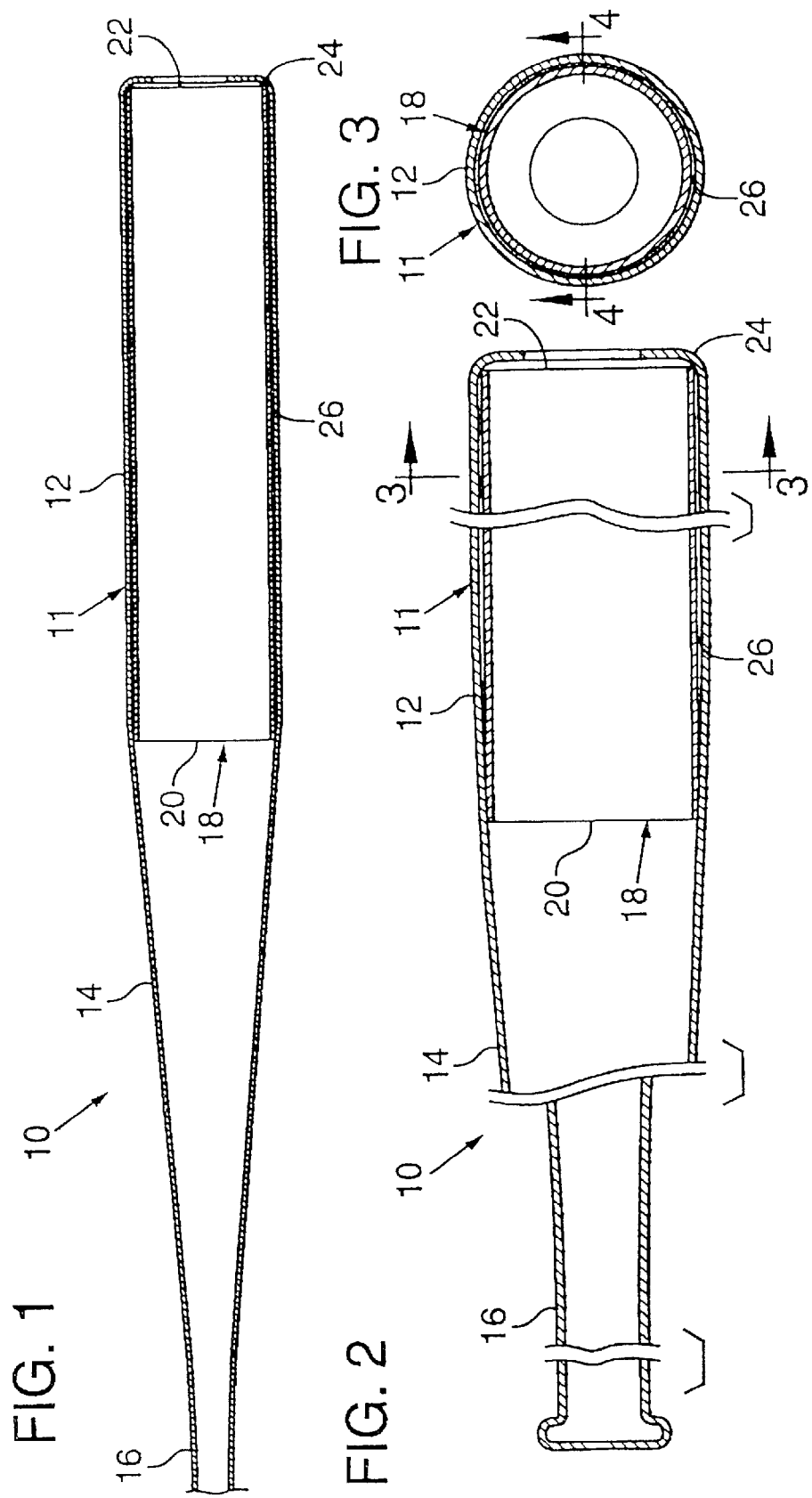

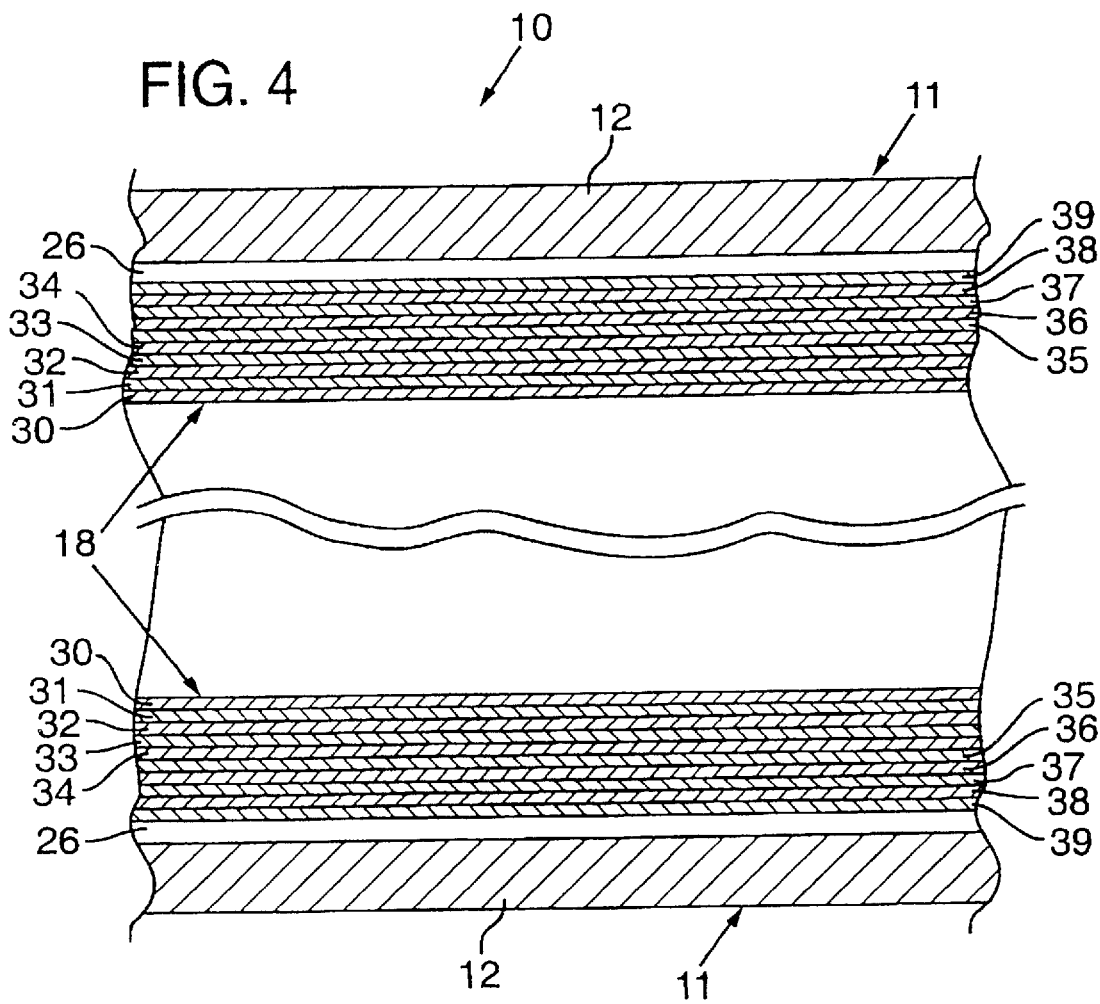

BALL BAT

This application is a division of application Ser. No. 09/108,754, Jul. 1, 1998, U.S. Pat. No. 6,251,034.

FIELD OF THE INVENTION

The present invention relates to softball and baseball bats and more particularly relates to the use of supportive structural members to improve the bat's impact response.

BACKGROUND OF THE INVENTION

Tubular metallic softball and baseball bats are well known in the art. A familiar example is a tubular aluminum bat. Particular embodiments of inserts for tubular baseball and softball bats are known in the art. Eggiman's U.S. Pat. No. 5,415,398 (Eggiman), which is incorporated herein by reference, concerns a softball bat, including an insert to provide structural support to the bat. The Background section of Eggiman discusses some prior designs produced in the continuing quest for bats with a better "slugging" capacity. Eggiman also discusses the desire to have bats with large elastic deflections, but without plastic deflection upon impact.

Eggiman discloses a tubular insert that fits within the frame of the bat, and is movable relative to the bat. In one embodiment the insert is separated from the frame by a gap that allows movement of the frame relative to the bat. Such an insert improves the impact response of the bat by increasing elastic deflection without allowing plastic deflection. The Eggiman softball bat is a considerable improvement over prior bat designs providing increased power transfer from the bat to the ball.

Nevertheless, the need for a bat with even better slugging capacity continues. It is desirable to improve the slugging capacity of bats without adding significant weight. This is particularly difficult in baseball bats where high impact forces require greater structural integrity within the bat to prevent unwanted plastic deformation. Prior baseball bats that provide this structural integrity typically added significant weight to the bat, did not allow sufficient elastic deformation within the bat, or decreased the diameter of the bat in the impact area to compensate for the added weight to the bat.

A further problem with prior bats is the size of the optimal hitting area or "sweet spot" of the bat. The sweet spot is typically located near the center of the impact area of the bat. The performance of the bat declines considerably when a ball impacts the bat outside the sweet spot, for example near the end of the bat. Typically, such an impact results in greater vibrations being felt by the user and decreased energy transfer from the bat to the ball.

Composite materials have been used to form the structural components of bats to improve their performance. An example is U.S. Pat. No. 5,364,095 by Easton. Easton discloses a tubular metal bat that is internally reinforced with a fiber composite sleeve. The Easton sleeve consists of multiple fiber layers, with each layer having bi-directional woven fibers that are directed at 0 and 90 degrees relative to the axis of the bat. The sleeve is formed so that it is bonded to the aluminum frame and it presses outwardly on the frame to produce a pre-load stress of several thousand pounds per square inch. This design does not allow for sufficient elastic deformation of the external frame of the bat. Moreover, the properties of the Easton composite sleeve are essentially isotropic.

BRIEF SUMMARY OF THE INVENTION

The present invention provides an improved insert, sleeve, or tubular member, for use with a baseball or softball bat that improves power transfer from the bat to the batted ball and that overcomes the shortcomings of the prior art. More specifically, the present invention provides a tubular member having anisotropic properties such that the tubular member is stronger in the direction of the greatest stress produced by an impact with a ball. By producing such anisotropic properties, less material, and therefore less weight, is required to produce the necessary stiffness and strength within the tubular member. Moreover, the impact response of the bat is improved.

In a preferred embodiment, the tubular member includes multiple layers of composite material. Each layer includes fibers that are directed substantially circumferentially about the tubular member. Since the largest component of stress within the tubular member produced by an impact with a ball is typically compressive hoop stress, which is directed substantially circumferentially about the tubular member, the circumferential layers are able to withstand the majority of the stress produced by an impact. The tubular member also includes non-circumferential layers that serve to hold the circumferential layers together and withstand the smaller stresses in other directions.

Also in a preferred embodiment, the tubular member is secured to the bat at each end of the tubular member. The intermediate portion of the tubular member is able to move freely relative to the tubular frame of the bat, thus allowing the tubular member to act as a leaf spring when the frame of the bat elastically deflects and impacts the tubular member.

The invention also provides a process for making the tubular member and a bat including the tubular member. The process includes positioning composite layers adjacent each other, such that each layer is tubular, and orienting at least one of the layers, such that unidirectional fibers supported within that layer extend substantially circumferentially. In one embodiment, the process includes wrapping the layers about a mandrel and subsequently curing the layers by heating the layers and applying pressure to the layers while they are heated.

BRIEF DESCRIPTION OF THE DRAWINGS

FIG. 1 shows a sectional view through the center of a bat incorporating an embodiment of the present invention.

FIG. 2 is a magnified cutaway view of the bat of FIG. 1.

FIG. 3 is a sectional view taken along line 3—3 of FIG. 2.

FIG. 4 is a magnified sectional view taken along line 4—4 of FIG. 3.

DESCRIPTION OF PREFERRED EMBODIMENT

FIG. 1 shows a softball bat 10 according to one embodiment of the present invention. However, it should be appreciated that the present invention is also well suited for baseball bats. The bat 10 has a tubular frame, or tubular member, 11 with a relatively large constant-diameter impact portion 12, an intermediate tapering portion 14, and a relatively small-diameter handle portion 16. In other embodiments, such as baseball bat applications, the impact portion also may be tapered.

In a preferred embodiment of the present invention, a tubular member, or insert, 18 is suspended within the impact portion 12 of the tubular frame 11. Preferably, the insert 18 is secured to the tubular frame 11 by a first interference fit wherein a first end 20 of the insert contacts the intermediate tapering portion 14 of the tubular frame 11, and a second interference fit wherein a second end 22 of the insert contacts the head portion 24 of the tubular frame 11. Alternatively, the insert 18 may be held within the tubular frame 11 in some other way, such as by fasteners. In one embodiment of the invention, the second end 22 of the insert 18 extends into an end plug which forms a closure for the tubular frame 11 at the head portion. The end plug, in turn, holds the second end 22 in place.

In a preferred embodiment of the present invention, a gap 26 exists between the tubular frame 11 and the insert 18. The gap 26 allows the tubular frame 11 to undergo some elastic deflection before contacting the insert 18. In a preferred embodiment of the present invention, a lubricant is disposed within the gap 26 to promote free movement between the insert 18 and the tubular frame 11. However, the lubricant may be omitted if the insert 18 will move freely within the tubular frame 11 even without the lubricant. The size of the gap 26 will vary depending on the size and type of bat. In some applications, the gap is very small. The gap 26 only needs to be sufficient to allow the insert 18 and the tubular frame 11 to move independent of each other upon impact. This independent movement allows the insert to act substantially as a leaf spring upon impact. In applications wherein a larger gap 26 is present, it is often advantageous for the impact portion 12 of the tubular frame 11 to be thinner so that the frame will deflect across the gap 26 to transfer a sufficient portion of the impact load to the insert 18.

Referring now to FIG. 4, the insert 18 is constructed using composite materials. In a preferred embodiment, the insert 18 includes multiple tubular composite layers 30–39. The layers 30–39 are adjacent each other and are arranged in a substantially concentric manner. The number of layers 30–39 must be sufficient to withstand the repeated stresses to which the insert 18 is subjected. However, preferably only the number of layers necessary to withstand these stresses should be added, since more layers will add more weight to the insert 18. The number of layers 30–39 will vary depending on the size and type of bat used. In a preferred embodiment, wherein the bat 10 is a softball bat, the insert 18 includes about ten layers 30–39. In uses wherein the bat is subjected to greater stresses, such as a baseball bat, more layers may be required. For example, an insert for a baseball bat may include about 15 layers. The number of necessary layers may also vary depending on the strength and stiffness of the tubular frame 11.

Each composite layer 30–39 includes structural material to provide structural stability, and matrix material to support the structural material. In a preferred embodiment, the structural material is a series of fibers that are supported within the matrix material. Most of the layers 32–37 include fibers that preferably extend substantially circumferentially. When the bat 10 strikes a ball, the greatest stress component on the insert 18 is directed circumferentially. Thus, the majority of the fibers are preferably directed to withstand these stresses. These layers 32–37 are often referred to as 90 degree layers or circumferential layers since they have fibers that are directed at substantially 90 degrees relative to the longitudinal axis of the layers, or substantially circumferentially. Preferably, the insert 18 also includes at least one layer that is not a circumferential layer (also referred to as a non-90 degree layer). The non-90 degree or non-circumferential layers 30, 31, 38, 39 hold the insert 18 together and withstand the smaller stresses in other directions. In a preferred embodiment, the two innermost layers 30, 31 and the two outermost layers 38, 39 are non-circumferential layers. Preferably, the four non-circumferential layers 30, 31, 38, 39 are woven layers, wherein fibers directed at substantially 90 degrees relative to the longitudinal axis of the layers, and fibers directed at substantially 0 degrees are woven together within each layer 30, 31, 38, 39. However, the non-circumferential layers may be unidirectional layers, wherein the fibers within the layers are parallel, and they may be located someplace besides the innermost or outermost layers.

It should be appreciated that some other layer configuration may be used that produces an insert that is most stiff and strong in a direction substantially 90 degrees relative to the longitudinal axis of the bat 10.

The circumferential layers 32–37 preferably consist of structural materials that are strong, stiff, and durable. In a preferred embodiment, the circumferential layers 32–37 include carbon fibers. However, the fibers could be some other type of known fiber material such as Kevlar™, or fiberglass.

The innermost non-circumferential layers 30, 31 preferably include structural material that is strong and durable. In a preferred embodiment, the structural material is fiberglass. Alternatively, the innermost layers 30, 31 may be some other type of known fiber such as carbon or Kevlar™. The outermost non-circumferential layers 30, 31 also preferably include fibers that are strong and durable. In a preferred embodiment, the outermost layers 38, 39 include carbon fibers. The combination of the woven carbon fiber layers 38, 39 on the outside and the woven fiberglass layers 30, 31 on the inside provide strength and stiffness properties that optimize the impact response of the insert 18. Alternatively, the outermost layers could include some other type of known fibers such as Kevlar™, or fiberglass.

The matrix in the circumferential layers 32–37 and the non-circumferential layers 30, 31, 38, 39 is preferably sufficiently durable and has sufficiently high adhesion properties to continue supporting the structural material even after repeated impacts. In a preferred embodiment, the matrix material is a toughened epoxy. Alternatively, the matrix can be some other thermally setting resin such as a polyester or vinyl ester. Persons skilled in the art will appreciate that a thermoplastic resin can be used, rather than a thermally setting resin.

As an example, wherein the insert 18 is used in a softball bat 10, the tubular frame 11 has a yield strength of 80,000 pounds/inch$^2$ and the impact portion 12 is about 13 inches long with a wall thickness of 0.058 inch. The insert 18 is slightly shorter than the impact portion 12 and has ten layers, with the two inner layers 30, 31 and the two outer layers 38, 39 being woven and the remainder being unidirectional circumferential layers 32–37 . The unidirectional layers 32–37 are typically 0.005–0.007 inch thick, while the woven layers are typically 0.008–0.009 inch thick. The outer diameter of the insert 18 is such that a gap 26 of about 0.007 inch exists between the outer surface of the insert and the inner surface of the impact portion 12 of the tubular frame 11. However, it should be understood that these dimensions are illustrative only, and that the dimensions may be altered while maintaining the advantages of the present invention.

Alternatively, the number of layers in the insert, and thus the thickness of the insert may vary along the length of the insert. For example, the end of the insert adjacent the tapering portion of the frame may have fewer layers than the remainder of the insert. Such an embodiment is advantageous, as it has more thickness and strength in the area where most impacts occur, while it has less thickness and less weight in the area where less impacts occur. Thus, the varying thickness may result in a lighter bat that still has sufficient strength and durability.

In an alternative embodiment of the present invention, the tubular member may be a sleeve that is disposed around the impact portion of the frame. The construction and orientation of the sleeve are similar to the insert described above. The sleeve has first and second ends adjacent the frame and an intermediate portion that is freely movable relative to the frame. The sleeve in this embodiment operates similarly to the insert described above, except that upon impact the sleeve is the member which initially deformed and forced into engagement with the underlying impact portion of the frame.

The greater stiffness and strength in substantially the circumferential direction produced by the layer configuration of the tubular member 18 produces several advantages. Because the direction of greatest strength and stiffness is substantially aligned with the direction of greatest stress upon impact, less material is required. Thus, less weight is required for the tubular member 18. Bat designs may exploit this advantage by producing a lighter bat or by increasing the length of the barrel or some other dimension.

The tubular member 18 also produces a bat 10 with superior impact response. This is especially true of impacts near the end of the bat 10, where impact response is usually poor. A possible explanation for this improved impact response is that the anisotropic strength and stiffness allow the tubular member 18 to retains its stiffness and strength even near the ends. Upon impact, a member such as the tubular member 18 receives much of its strength and stiffness from the supporting material surrounding the point of impact. In material having isotropic properties, such as metal, this support is received from the material surrounding the impact in all directions. Thus, when an isotropic tubular member is impacted near its end it does not receive adequate support because there is not as much material in the longitudinal direction surrounding the point of impact. However, with materials having anisotropic properties, such as the insert, or sleeve, of the present invention, most of the support is received from the material in the direction of the greatest stiffness and strength. Thus, in the embodiment described above, the support comes mainly from the material located circumferentially from the point of impact. Since the point of impact relies very little on the material in the longitudinal direction for support, even if the point of impact is very near the end of the tubular member 18, it is adequately supported. Thus, the optimal hitting area or "sweet spot" of the bat 10 is enlarged by the present invention.

In constructing the bat 10 of the illustrated embodiment of the present invention, the tubular frame 11 is preferably formed from aluminum. The tubular member, insert, or sleeve, 18 is then formed and secured to the tubular frame 11. The tubular frame 11 is formed using known methods. In a preferred embodiment, the tubular frame is swaged from a constant diameter aluminum tube to yield an integral, weld free frame. Such swaging results in a tubular frame 11 with thinner walls at the impact portion 12 and thicker walls at the handle portion 16. While swaging is used to produce the tubular frame 11 of the illustrated embodiment, it should be understood that other methods of manufacturing the tubular frame may work equally as well.

The tubular member 18 is preferably formed by wrapping sheets of preimpregnated composite material around a mandrel. A first layer 30 is wrapped on the mandrel, followed by a second layer 31, etc. until the desired number of layers have been wrapped around the mandrel to form the tubular member 18.

Alternatively, the layers 30–39 may be formed by some other method, such as a filament winding process. With a filament winding process, a continuous fiber, rather than a preimpregnated sheet as described above, is wrapped around a mandrel. The filament winding process may use a preimpregnated fiber. Alternatively, the continuous fiber may run through a resin bath before it is wrapped onto the mandrel. The filament winding process typically winds the fiber in a helical path along the mandrel, making it difficult to produce a layer having fibers that are at exactly 90 degrees relative to the longitudinal axis of the layers. Thus, the circumferential layers 32–37 may include layers that are at an angle of substantially 90 degrees, but are not exactly 90 degrees.

Preferably, the tubular member 18 is then wrapped in shrink tape and placed in an oven between 250 and 300 degrees Fahrenheit for about 45 minutes to one hour. The shrink tape preferably is temperature resistant and has high shrinkage and compaction capabilities when it is heated. Heating the tubular member 18 speeds the curing process, but the tubular member 18 may be allowed to cure at a lower temperature for a longer period of time. For example, the tubular member 18 may be allowed to cure at room temperature for several days. The oven heats the shrink tape, causing it to pressurize the tubular member 18 by shrinking around it. The pressure forces entrapped air out of the tubular member 18. In a preferred embodiment, a pressure of 80 psi is applied to the tubular member 18 during curing. However, the pressure may range from 15 to 150 psi depending on the flow properties of the matrix material used. Alternatively, some other known apparatus may be used to pressurize the tubular member 18 during curing, such as a bladder, an autoclave or a vacuum bag.

After the tubular member 18 has cured, it is secured to the tubular frame 11 of the bat 10. In a preferred embodiment, wherein the tubular member is held between two interference fits, the head portion 24 of the tubular frame 11 is crimped to form the second interference fit with the second end 22 of the tubular member 18. Alternatively, if the tubular member 18 is to be held in place by an end cap, the end cap is formed at the head portion of the bat to support the tubular member.

In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

We claim:

1. A method of forming a bat, comprising:
    providing a tubular frame;
    providing plural composite layers, with each layer comprising a matrix and structural fibers supported by the matrix, and positioning the plural composite layers adjacent each other such that each layer is tubular, orienting at least one of the layers which is a circumferential layer such that fibers supported within that circumferential layer are substantially unidirectional and extend substantially circumferentially, and orienting at least one of the layers which is a non-circumferential layer such that fibers supported within that non-circumferential layer do not extend substantially circumferentially;
    curing the layers to form a tubular member having spaced first and second ends and a central portion intermediate said first and second ends, said tubular member having its greatest strength in a substantially circumferential direction; and securing the tubular member to the frame substantially concentric with the tubular frame with the first and second ends adjoining the tubular frame and the central portion freely moveable relative to the frame.

2. The method of claim 1, wherein the curing step comprises:

heating the layers; and applying pressure to the layers while the layers are heated.

3. The method of claim 2, wherein the applying pressure step includes wrapping shrink tape around the layers before the heating step so that the shrink tape will shrink around the layers during the heating step.

4. The method of claim 1, wherein the positioning step comprises wrapping plural sheets of preimpregnated composite material onto a mandrel.

5. The method of claim 1, wherein the positioning step includes orienting the majority of the layers so that the fibers within those layers extend substantially circumferentially.

6. The method of claim 5, wherein the positioning step includes orienting an innermost layer so that at least a portion of the fibers in that layer does not extend substantially circumferentially.

7. The method of claim 1 wherein the number of circumferential layers is greater than the number of non-circumferential layers.

8. The method of claim 1, wherein the layers are positioned such that an innermost layer is a non-circumferential layer and an outermost layer is a non-circumferential layer.

9. The method of claim 1, wherein the structural fibers comprise carbon.

10. The method of claim 1, wherein the matrix comprises epoxy.

11. The method of claim 1, wherein the tubular member is secured to the frame with a gap between the central portion of the tubular member and the frame.

12. The method of claim 11, wherein lubricant is deposited in said gap.

13. A method of forming a bat, comprising:

providing a tubular frame;

providing plural composite layers, with each layer comprising a matrix and structural fibers supported by the matrix, and positioning the plural composite layers adjacent each other such that each layer is tubular, orienting at least one of the layers which is a circumferential layer such that fibers supported within that circumferential layer are substantially unidirectional and extend substantially circumferentially, and orienting at least one of the layers which is a non-circumferential layer such that fibers supported within that non-circumferential layer do not extend substantially circumferentially, the number of circumferential layers being greater than the number of non-circumferential layers, and the layers including an innermost layer that is a non-circumferential layer and an outermost layer that is a non-circumferential layer;

curing the layers to form a tubular member having spaced first an second ends and a central portion intermediate said first and second ends, said tubular member having its greatest strength in a substantially circumferential direction; and securing the tubular member to the frame substantially concentric with the tubular frame with the first and second ends adjoining the tubular frame and the central portion freely moveable relative to the frame.

14. The method of claim 13, wherein the curing step comprises heating the layers, and applying pressure to the layers while the layers are heated.

15. The method of claim 14, wherein the positioning step comprises:

providing plural sheets of preimpregnated composite material; and wrapping the sheets onto a mandrel.

16. The method of claim 14, wherein the applying pressure step includes wrapping shrink tape around the layers after the positioning step so that the shrink tape will shrink around the layers during the heating step to perform the applying pressure step.

* * * * *